United States Patent
Suzuki et al.

(10) Patent No.: US 8,734,625 B2
(45) Date of Patent: *May 27, 2014

(54) HYDROGEN GENERATION DEVICE

(75) Inventors: Takahiro Suzuki, Osaka (JP); Takaiki Nomura, Osaka (JP); Kazuhito Hatoh, Osaka (JP); Noboru Taniguchi, Osaka (JP); Tomohiro Kuroha, Osaka (JP); Kenichi Tokuhiro, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/522,855

(22) PCT Filed: Jan. 19, 2011

(86) PCT No.: PCT/JP2011/000269
§ 371 (c)(1),
(2), (4) Date: Jul. 18, 2012

(87) PCT Pub. No.: WO2011/089904
PCT Pub. Date: Jul. 28, 2011

(65) Prior Publication Data
US 2012/0285823 A1 Nov. 15, 2012

(30) Foreign Application Priority Data
Jan. 22, 2010 (JP) ................. 2010-012216

(51) Int. Cl.
| C25B 9/00 | (2006.01) |
| C25B 11/00 | (2006.01) |
| C25B 9/04 | (2006.01) |
| C25B 9/06 | (2006.01) |
| C25B 9/16 | (2006.01) |
| C25B 11/04 | (2006.01) |

(52) U.S. Cl.
USPC ........... 204/278; 204/193; 204/194; 204/204; 204/248; 204/290.01; 136/255

(58) Field of Classification Search
CPC .......... C25B 11/00; C25B 11/04; C25B 9/00; C25B 9/04; C25B 9/06; C25B 9/16

USPC ............... 204/248, 193, 194, 242, 290.01; 136/255
See application file for complete search history.

(56) References Cited

U.S. PATENT DOCUMENTS

| 4,927,721 | A | 5/1990 | Gratzel et al. | |
| 2008/0286643 | A1* | 11/2008 | Iwasaki | 429/111 |
| 2009/0090411 | A1* | 4/2009 | Choi et al. | 136/252 |
| 2010/0282601 | A1* | 11/2010 | Nomura et al. | 204/242 |

FOREIGN PATENT DOCUMENTS

| JP | 57-067002 | 4/1982 |
| JP | 2664194 | 6/1997 |

(Continued)

OTHER PUBLICATIONS

English Translation of WO 2007/129727; 2007.*

Primary Examiner — Harry D Wilkins, III
Assistant Examiner — Zulmariam Mendez
(74) Attorney, Agent, or Firm — Hamre, Schuamnn, Mueller & Larson, P.C.

(57) ABSTRACT

A hydrogen generation device (100) of the present invention includes: a transparent substrate (1); a photocatalytic electrode (4) formed of a transparent conductive layer (2) and a photocatalytic layer (3) disposed on the transparent substrate (1); a counter electrode (8) connected electrically to the transparent conductive layer (2); a water-containing electrolyte solution layer provided between the photocatalytic electrode (3) and the counter electrode (8); a separator (6) that separates the electrolyte solution layer into a first electrolyte solution layer (5) in contact with the photocatalytic electrode (4) and a second electrolyte solution layer (7) in contact with the counter electrode (8); a first gas outlet (14) for discharging a gas generated in the first electrolyte solution layer (5); and a second gas outlet (15) for discharging a gas generated in the second electrolyte solution layer (7). The photocatalytic electrode (4) and the counter electrode (8) are arranged so that a surface of the photocatalytic layer (3) and a surface of the counter electrode (8) face each other. The separator (6) allows an electrolyte in the electrolyte solution layer to pass therethrough and prevents hydrogen gas and oxygen gas in the electrolyte solution layer from passing therethrough.

12 Claims, 13 Drawing Sheets

(56) References Cited

FOREIGN PATENT DOCUMENTS

| | | |
|---|---|---|
| JP | 9-234374 | 9/1997 |
| JP | 2003-088753 | 3/2003 |
| JP | 2004-197167 | 7/2004 |
| JP | 2006-265697 | 10/2006 |
| JP | 2006-302695 | 11/2006 |
| JP | 2007-196165 | 8/2007 |
| WO | 2007/129727 | 11/2007 |

* cited by examiner

HYDROGEN GENERATION DEVICE

TECHNICAL FIELD

The present invention relates to a hydrogen generation device designed to obtain hydrogen gas by using light to decompose water into hydrogen and oxygen.

BACKGROUND ART

As a conventional method of utilizing a semiconductor material that acts as a photocatalyst, there is known a technique for obtaining hydrogen through water decomposition or for obtaining electrical energy by irradiating the semiconductor material with light (see, for example, Patent Literatures 1 and 2).

Patent Literature 1 discloses a water decomposition semiconductor photoelectrode having a structure in which a photocatalyst and a solar cell are laminated together, and a water decomposition system using this electrode. This semiconductor photoelectrode is composed of a photocatalytic film, a transparent conductive film, a transparent substrate provided with an electrode for electrically connecting the front and back surfaces thereof, a transparent conductive film, an electrolyte solution, a dye-supported titanium oxide layer, a metal substrate, and a hydrogen evolution catalytic layer, in this order from the light receiving surface side. Patent Literature 1 discloses that water is decomposed by irradiating this semiconductor photoelectrode with sunlight to obtain hydrogen gas and oxygen gas. Specifically, Patent Literature 1 describes the use of a film made of a material selected from the group consisting of titanium oxide, tungsten oxide, and iron (III) oxide, as the photocatalytic film.

Patent Literature 2 discloses a regenerative photoelectrochemical cell including a polycrystalline metal oxide semiconductor as a photocatalyst. Patent Literature 2 discloses a photoelectrochemical cell whose polycrystalline metal oxide semiconductor does not corrode and which has an improved electrical energy yield in the visible spectral region (more specifically, in the spectral region of sunlight), and the use of the cell.

CITATION LIST

Patent Literature

Patent Literature 1 JP 2006-265697 A
Patent Literature 2 JP 2664194 B2

SUMMARY OF INVENTION

Technical Problem

However, as for the water decomposition system disclosed in Patent Literature 1, in the water decomposition semiconductor photoelectrode, the surface of the photocatalytic film, which is the oxygen evolution section, is separated from the surface of the hydrogen evolution catalytic layer, which is the hydrogen evolution section, by the semiconductor photoelectrode itself. Therefore, protons are transferred only through a gap provided below the semiconductor photoelectrode, and sufficient transfer of protons from the photocatalytic film side to the hydrogen evolution catalyst layer side, which is required for hydrogen generation, does not occur. As a result, protons become diffusion-controlled near the hydrogen evolution catalytic layer, and the reaction efficiency decreases as the hydrogen and oxygen evolution reactions proceed by irradiation with light. In addition, this system does not have a mechanism for preventing the mixture of gases between the oxygen evolution section and the hydrogen evolution section. Therefore, the generated hydrogen gas and oxygen gas are mixed together, which makes it difficult to collect them separately.

The photoelectrochemical cell and the use thereof disclosed in Patent Literature 2 utilize the operating principle of a common dye-sensitized solar cell. That is, since the technique disclosed in Patent Literature 2 is designed to convert light energy into electrical energy and extract the electrical energy, it cannot be used as it is as a technique for decomposing water to extract hydrogen. Specifically, electrons and holes generated by irradiating the dye-supported titanium oxide layer (a polycrystalline metal oxide semiconductor as a photocatalyst) with light pass through an external circuit, and then both of them are consumed in the redox reaction of the electrolyte. Therefore, they cannot oxidize or reduce water molecules in the aqueous electrolyte solution. As a result, the photoelectrochemical cell cannot generate oxygen and hydrogen.

In view of the above conventional problems, it is an object of the present invention to provide, as a device for utilizing water decomposition reaction caused by a photocatalyst to obtain hydrogen, a hydrogen generation device capable of preventing the efficiency of hydrogen and oxygen evolution reactions from decreasing as the reactions proceed so as to increase the efficiency of the hydrogen evolution reaction and further collecting the generated hydrogen easily.

Solution to Problem

The present invention provides a hydrogen generation device including: a transparent substrate; a photocatalytic electrode formed of a transparent conductive layer disposed on the transparent substrate and a photocatalytic layer disposed on the transparent conductive layer; a counter electrode connected electrically to the transparent conductive layer; a water-containing electrolyte solution layer provided between the photocatalytic electrode and the counter electrode; a separator that separates the electrolyte solution layer into a first electrolyte solution layer in contact with the photocatalytic electrode and a second electrolyte solution layer in contact with the counter electrode; a first gas outlet, connected to the first electrolyte solution layer, for discharging oxygen gas or hydrogen gas generated in the first electrolyte solution layer; and a second gas outlet, connected to the second electrolyte solution layer, for discharging hydrogen gas or oxygen gas generated in the second electrolyte solution layer. In this device, the photocatalytic electrode and the counter electrode are arranged so that a surface of the photocatalytic layer and a surface of the counter electrode face each other, and the separator allows an electrolyte in the electrolyte solution layer to pass therethrough and prevents hydrogen gas and oxygen gas in the electrolyte solution layer from passing therethrough.

Advantageous Effects of Invention

According to the hydrogen generation device of the present invention, the distance between the surface of the photocatalytic layer and the surface of the counter electrode is closer over the surfaces. Therefore, protons are sufficiently transferred and diffused to the surface of the photocatalytic layer or the surface of the counter electrode, which is the hydrogen evolution section. As a result, the efficiency of the hydrogen evolution reaction is improved. Furthermore, the electrolyte solution layer is separated into the first electrolyte solution layer in contact with the photocatalytic layer and the second electrolyte solution layer in contact with the counter electrode by the separator that allows the electrolyte in the electrolyte solution layer to pass therethrough but prevents hydrogen gas and oxygen gas generated in the electrolyte solution layer from passing therethrough. Accordingly, oxygen (or hydrogen) generated on the surface of the photocatalytic layer and hydrogen (or oxygen) generated on the surface of the counter electrode can be easily separated, which makes it easier to collect the generated hydrogen.

DESCRIPTION OF EMBODIMENTS

Hereinafter, the embodiments of the present invention are described in detail with reference to the drawings. The following embodiments are merely examples, and the present invention is not limited to these embodiments. Furthermore, in the following embodiments, the same parts are denoted by the same numerals, and the same description may be omitted.

First Embodiment

Figure 1:
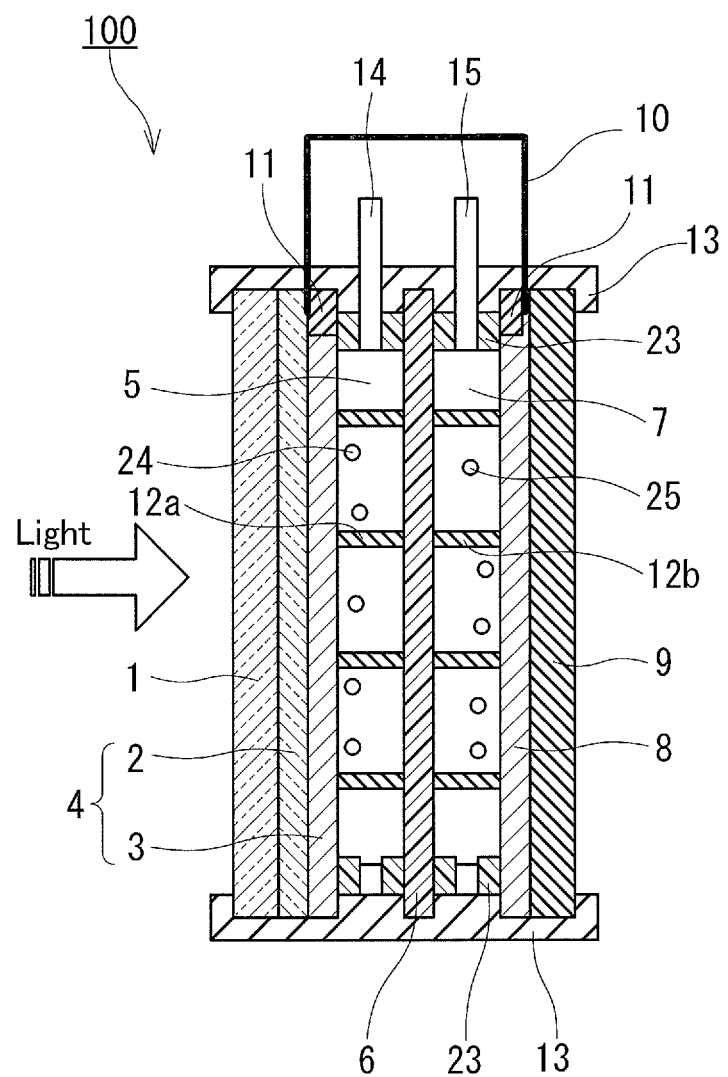
FIG. 1 is a schematic diagram showing the configuration of a hydrogen generation device according to a first embodiment of the present invention.
Figure 2:
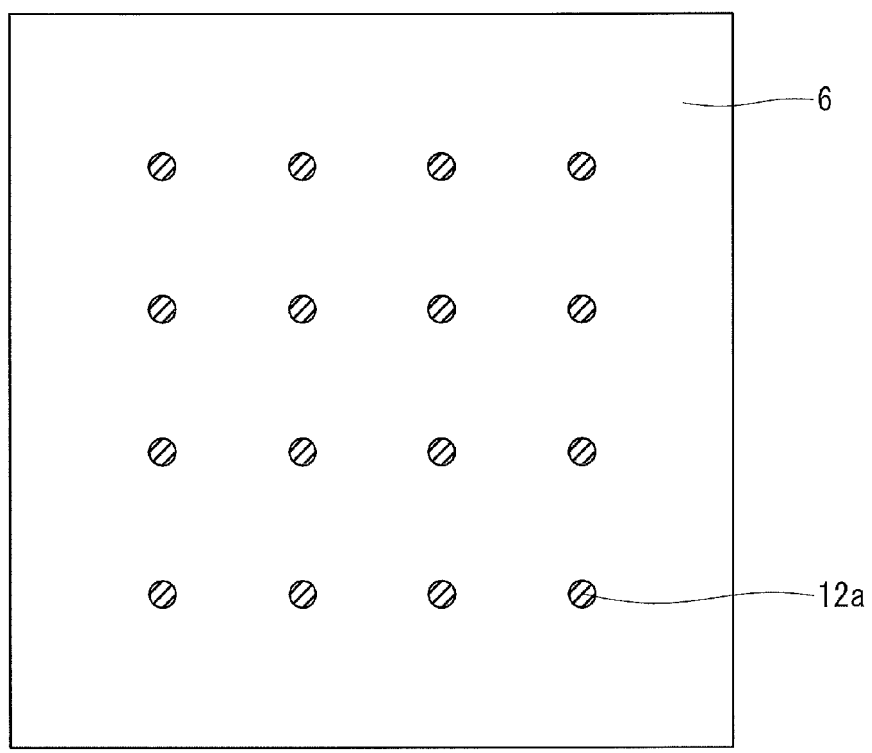
FIG. 2 is a diagram showing first projections provided as a fixing and supporting member in the hydrogen generation device according to the first embodiment of the present invention, as viewed in a light irradiation direction.

The hydrogen generation device of the first embodiment of the present invention is described with reference to FIG. 1 and FIG. 2. FIG. 1 is a schematic diagram showing the configuration of the hydrogen generation device of the present embodiment. FIG. 2 is a diagram showing first projections provided as a fixing and supporting member in the hydrogen generation device, as viewed in a light irradiation direction.

A hydrogen generation device 100 of the present embodiment includes: a transparent substrate 1; a photocatalytic electrode 4 disposed on the transparent substrate 1; a counter electrode 8; a water-containing electrolyte solution layer provided between the photocatalytic electrode 4 and the counter electrode 8; and a separator 6 that separates the electrolyte solution layer into a first electrolyte solution layer 5 and a second electrolyte solution layer 7. The first electrolyte solution layer 5 is in contact with the photocatalytic electrode 4. The second electrolyte solution layer 7 is in contact with the counter electrode 8.

In the present embodiment, the counter electrode 8 is disposed on a back substrate 9. The back substrate 9 is disposed to face the transparent substrate 1. As stated herein, "the back substrate 9 is disposed to face the transparent substrate 1" means that they are arranged to face each other. Therefore, this arrangement is not limited only to a configuration in which the transparent substrate 1 and the back substrate 9 are arranged almost in parallel, as shown in FIG. 1. That is, the transparent substrate 1 and the back substrate 9 do not have to be parallel to each other as long as they are arranged to face each other. Furthermore, in FIG. 1, the transparent substrate 1 and the back substrate 9 have almost the same size. However, the transparent substrate 1 and the back substrate 9 do not need to have the same size, and they may have different sizes and shapes.

The photocatalytic electrode 4 is composed of a transparent conductive layer 2 disposed on the transparent substrate 1 and a photocatalytic layer 3 disposed on the transparent conductive layer 2.

In the hydrogen generation device 100, the transparent substrate 1, the transparent conductive layer 2, the photocatalytic layer 3, the first electrolyte solution layer 5, the separator 6, the second electrolyte solution layer 7, the counter electrode 8, and the back substrate 9 are arranged in this order from the light irradiation side, along the traveling direction of the light with which the hydrogen generation device 100 is irradiated. That is, the photocatalytic electrode 4 and the counter electrode 8 are arranged so that the surface of the photocatalytic layer 3 and the surface of the counter electrode 8 face each other across the electrolyte solution layer. The photocatalytic layer 3 and the counter electrode 8 may be arranged in any manner as long as their surfaces face each other across the electrolyte solution layer. Therefore, their arrangement is not limited only to a configuration in which the surface of the photocatalytic layer 3 and the surface of the counter electrode 8 are arranged almost in parallel. That is, the surface of the photocatalytic layer 3 and the surface of the counter electrode 8 do not have to be parallel to each other as long as they are arranged to face each other. Furthermore, FIG. 1 shows a configuration in which the photocatalytic layer 3 and the counter electrode 8 have almost the same size.

However, the photocatalytic layer 3 and the counter electrode 8 do not need to have the same size, and they may have different sizes and shapes.

The transparent substrate 1, the photocatalytic electrode 4 (the transparent conductive layer 2 and the photocatalytic layer 3), the electrolyte solution layer (the first electrolyte solution layer 5 and the second electrolyte solution layer 7), the separator 6, the counter electrode 8, and the back substrate 9 are held together by an outer frame 13. The outer frame 13 is joined to the outer edges of the transparent substrate 1, the photocatalytic electrode 4, the separator 6, the counter electrode 8, and the back electrode 9 to fix these members in place and holds them to form a layered structure along the traveling direction of the incident light.

The transparent conductive layer 2 and the counter electrode 8 are connected electrically to each other by a conducting wire 10. The electrical contacts between the transparent conductive layer 2 and the conducting wire 10 and between the counter electrode 8 and the conducting wire 10 are each covered with an insulating material 11 to prevent the contact with the electrolyte solution layer.

When the photocatalytic layer 3 is irradiated with light, the hydrogen generation device 100 decomposes water in the electrolyte solution layer to generate oxygen and hydrogen. In the present embodiment, an n-type semiconductor is used for the photocatalytic layer 3, as described later. Therefore, oxygen 24 is generated on the surface of the photocatalytic layer 3, and hydrogen 25 is generated on the surface of the counter electrode 8. The hydrogen generation device 100 is provided with gas outlets for discharging gases generated in the electrolyte solution layer. A first gas outlet 14 for discharging a gas generated in the first electrolyte solution layer 5 is connected to the first electrolyte solution layer 5 in contact with the photocatalytic layer 3. A second gas outlet 15 for discharging a gas generated in the second electrolyte solution layer 7 is connected to the second electrolyte solution layer 7 in contact with the counter electrode 8. In the present embodiment, the first gas outlet 14 serves as an oxygen gas outlet, and the second gas outlet 15 serves as a hydrogen gas outlet. The first gas outlet 14 and the second gas outlet 15 are connected to the upper portions of the first electrolyte solution layer 5 and the second electrolyte solution layer 7, respectively, so that they penetrate the outer frame 13. In FIG. 1, a sealing material is denoted by 23.

Next, each of the components of the hydrogen generation device 100 is described specifically.

For the transparent substrate 1, a material that transmits light in the visible region, more desirably light with wavelengths in the visible region and the near-visible region. Examples of the material for the transparent substrate 1 include glass and resin. The thickness of the transparent substrate 1 is preferably 5 mm or less to allow a greater amount of light to reach the photocatalytic layer 3. On the other hand, the thickness of the transparent substrate 1 is preferably 2 mm or more in view of mechanical strength.

For the transparent conductive layer 2, a material that transmits light in the visible region, more desirably light with wavelengths in the visible region and the near-visible region, and has conductivity. Examples of the material for the transparent conductive layer 2 include indium tin oxide (ITO) and fluorine-doped tin oxide (FTO). Thereby, the incident light in the visible region (more desirably light with wavelengths in the visible region and the near-visible region) reaches the photocatalytic layer 3.

The photocatalytic layer 3 is formed of an n-type semiconductor. The photocatalytic layer 3 needs to be excited by irradiation with light to decompose water. Therefore, it is preferred that the photocatalytic layer 3 be formed of a semiconductor having a conduction band edge level of electrochemically more negative than 0 V vs. NHE, which is the standard reduction potential of protons, and a valence band edge level of electrochemically more positive than +1.23 V vs. NHE, which is the standard oxidation potential of water. Semiconductors that can be used effectively for that purpose include: oxides, oxynitrides and nitrides containing one or more elements of titanium, tungsten, iron, copper, tantalum, gallium, and indium; these oxides, oxynitrides and nitrides additionally containing alkali metal ions or alkaline earth metal ions; and metals supporting, on their surfaces, iron, copper, silver, gold, platinum, or the like. Among these, metals supporting, on their surfaces, iron, copper, silver, gold, platinum, or the like are used particularly preferably because they decrease overpotentials of water decomposition. Furthermore, a laminated multilayer film of a film made of a material having a conduction band edge level of electrochemically more negative than 0 V vs. NHE, which is the standard reduction potential of protons, and a film made of a material having a valence band edge level of electrochemically more positive than +1.23 V vs. NHE, which is the standard oxidation potential of water, also is used effectively. As an example, a $WO_3$/ITO/Si multilayer film or the like, for example, is used effectively.

The thickness of the photocatalytic layer 3 is preferably 100 μm or less so that holes generated on the light incident surface side can be transferred efficiently to the opposite surface (the interface with the first electrolyte solution layer 5). The thickness of the photocatalytic layer 3 is preferably 0.2 μm or more because it needs to absorb incident light sufficiently.

In the present embodiment, an n-type semiconductor is used for the photocatalytic layer 3, but a p-type semiconductor also may be used. In that case, hydrogen is generated on the surface of the photocatalytic layer 3 and oxygen is generated on the surface of the counter electrode 8 in the resulting hydrogen generation device.

For the counter electrode 8, a material that has conductivity and is active for the hydrogen evolution reaction (oxygen evolution reaction in the case where the photocatalytic layer 3 is made of a p-type semiconductor) is used. Examples of the material for the counter electrode 8 include carbon and noble metals that are commonly used as electrodes for water electrolysis. Specifically, carbon, platinum, platinum-supported carbon, palladium, iridium, ruthenium, nickel, etc. can be used. The overall shape of the counter electrode 8 is not particularly limited. The counter electrode 8 of any shape can be used. The shape is, for example, a flat plate, a flat plate having through-holes such as a perforated flat plate and a mesh, and a flat plate having comb-like slits. However, it is preferred that the overall shape of the counter electrode 8 be almost the same as that of the photocatalytic layer 3 so that the entire counter electrode 8 can face the photocatalytic layer 3. The area of the surface of the counter electrode 8 facing the photocatalytic layer 3 (in the case of the counter electrode 8 having voids, the area of the outline of the counter electrode 8 including the voids) may be different from the area of the surface of the photocatalytic layer 3 facing the counter electrode 8. However, desirably, it is preferred that the surface of the counter electrode 8 and the surface of the photocatalytic layer 3 have almost the same area so that these surfaces entirely face each other.

The counter electrode 8 may have a configuration in which light that has passed through the transparent substrate 1, the transparent conductive layer 2, the photocatalytic layer 3 and the separator 6 and reached the counter electrode 8 is reflected from the surface of the counter electrode 8. For example, in order to increase the light reflectance of the surface of the counter electrode 8, measures, such as an appropriate selection of the material for the counter electrode 8 and an appropriate design of the shape of the surface of the counter electrode 8 (for example, a mirror finish of the surface) may be taken. With this configuration, the light reflected from the surface of the counter electrode 8 is again incident on the photocatalytic layer 3 and contributes to the photoexcitation of the photocatalytic layer 3. Therefore, when the counter electrode 8 is configured as such, the light utilization efficiency is further improved. In the configuration utilizing the light reflected from the counter electrode 8, it is preferred that the separator 6 be made of a material having a high light transmittance.

The separator 6 has functions of allowing the electrolyte in the electrolyte solution layer to pass therethrough and preventing hydrogen gas and oxygen gas in the electrolyte solution layer from passing therethrough. Any material can be used for the separator 6 as long as the material has these functions. Examples of the material for the separator 6 include a solid electrolyte such as a polymeric solid electrolyte. As the polymeric solid electrolyte, an ion exchange membrane such as Nafion (registered trademark) can be mentioned. A porous ceramic material also can be used for the separator 6. A porous ceramic material with a highly reflective metal film provided on the surface on the light incident side also may be used for the separator 6. Such a metal film reflects the light that has passed through the transparent substrate 1, the transparent conductive layer 2 and the photocatalytic layer 3 and reached the separator 6. The reflected light is again incident on the photocatalytic layer 3 and contributes to the photoexcitation of the photocatalytic layer 3. Therefore, the light utilization efficiency is further improved.

The back substrate 9 can be formed of an insulating material, for example, glass and plastic. The thickness of the back substrate 9 may be, for example, 2 to 5 mm. In the present embodiment, the back substrate 9 for supporting the counter electrode 8 is provided, but a configuration without the back substrate 9 also may be adopted. For example, in the case where the counter electrode 8 is formed of a metal plate and the externally exposed surface of the counter electrode 8 is covered with an insulating film, there is no need to provide the back substrate 9.

Any electrolyte solution containing water can be used for the electrolyte solution that constitutes the first electrolyte solution layer 5 and the second electrolyte solution layer 7. The electrolyte solution may be acidic or alkaline. Preferably, the thicknesses of the first electrolyte solution layer 5 and the second electrolyte solution layer 7 are each in the range of 2 to 10 mm. Thereby, protons are transferred and diffused sufficiently. Furthermore, such a thickness of the first electrolyte solution layer 5 and the second electrolyte solution layer 7 also leads to a decrease in the weight of the entire hydrogen generation device, which is desirable in view of mechanical strength.

A material having sufficient strength is used for the outer frame 13 to prevent the deformation of each component held thereby. For example, plastic, metallic and ceramic materials are suitable.

The hydrogen generation device 100 is further provided with first projections 12a and second projections 12b as a fixing and supporting member that fixes the separator 6 in place and supports the separator 6. The fixing and supporting member is designed to fix and support the separator 6 so that the separator 6 is disposed with predetermined distances from the surface of the photocatalytic layer 3 and the surface of the counter electrode 8. That is, the distance between the surface of the photocatalytic layer 3 and the separator 6 and the distance between the surface of the counter electrode 8 and the separator 6 are maintained constant by the fixing and supporting member over the entire surfaces of the separator 6. The distance between the surface of the photocatalytic layer 3 and the separator 6 and the distance between the surface of the counter electrode 8 and the separator 6 are not particularly limited. For example, there may be a significant difference between these distances. One example of such a configuration is, for example, a configuration in which the separator 6 made of a soft material such as Nafion (registered trademark) is disposed very close to the surface of the photocatalytic layer 3 or the surface of the counter electrode 8. In this case, the separator 6 is bent by the gas generated on the surface of the photocatalytic layer 3 (or the counter electrode 8) located close to the separator 6. This bending of the separator 6 forms the first electrolyte solution layer 5 (or the second electrolyte solution layer 7) between the separator 6 and the photocatalytic layer 3 (or the counter electrode 8). Therefore, there is no problem in terms of the contact between the photocatalytic layer 3 (or the counter electrode 8) and the electrolyte solution. However, when the distance between the separator 6 and one of the electrodes is extremely short, the generated bubbles may adhere to the inner side of this space, which makes it difficult to collect the gas. Therefore, it is preferable to place the separator 6 so that these distances are almost equal. For the fixing and supporting member, a material that is strong enough to support the separator 6 without bending the separator 6 or without being deformed itself and has insulating properties can be used. Examples of such a material include plastics, ceramics, and insulation-covered metals. In addition, the fixing and supporting member needs to be configured to have voids large enough to maintain the contact between the separator 6 and the electrolyte solution and to transfer ions efficiently between the first electrolyte solution layer 5 and the second electrolyte solution layer 7 through the separator 6.

The first projections 12a are provided on the surface of the photocatalytic layer 3. The second projections 12b are provided on the surface of the counter electrode 8. As shown in FIG. 2, a plurality of first projections 12a are provided so as to be arranged at regular intervals on the surface of the separator 6, when the first projections 12a are viewed in the light irradiation direction. The second projections 12b are each provided at a position corresponding to the first projection 12a with the separator 6 interposed therebetween. That is, the first projection 12a and the second projection 12b are disposed so that their positions coincide with each other, as viewed in a direction perpendicular to the surface of the separator 6. It is desirable to determine the surface areas of the photocatalytic layer 3, the counter electrode 8 and the separator 6 covered by the first projections 12a and the second projections 12b so as not to inhibit the oxygen evolution reaction on the surface of the photocatalytic layer 3, the hydrogen evolution reaction on the surface of the counter electrode 8, and the transfer of ions through the separator 6. The surface areas of the photocatalytic layer 3, the counter electrode 8 and the separator 6 covered by the first projections 12a and the second projections 12b are each preferably 10% or less, for example, more preferably 2% or less, of the total area of each surface. Thereby, even if the first projections 12a and the second projections 12b are provided, the electrolyte solution can be in sufficient contact with the surface of the photocatalytic layer 3, the surface of the counter electrode 8, and the surface of the separator 6. Therefore, the oxygen evolution reaction on the surface of the photocatalytic layer 3, the hydrogen evolution reaction on the surface of the counter electrode 8, and the transfer of ions through the separator 6 are not inhibited.

Next, the operation of the hydrogen generation device 100 is described.

In the hydrogen generation device 100, the light that has passed through the transparent substrate 1 and the transparent conductive layer 2 is incident on the photocatalytic layer 3. Electrons are generated in the conduction band of the photocatalytic layer 3 and holes are generated in the valence band thereof by photoexcitation of the photocatalytic layer 3. The holes generated at this time are transferred toward the surface of the photocatalytic layer 3 (the interface with the first electrolyte solution layer 5). Thereby, water molecules are oxidized on the surface of the photocatalytic layer 3 and thus oxygen is generated (see the following reaction formula (1)). On the other hand, the electrons are transferred to the transparent conductive layer 2. The electrons transferred to the transparent conductive layer 2 are transferred to the counter electrode 8 side through the conducting wire 10. The electrons that have been transferred through the counter electrode 8 and reached the surface of the counter electrode 8 (the interface with the second electrolyte solution layer 7) react with protons supplied to the vicinity of the surface of the counter electrode 8 (see the following reaction formula (2)), and thus hydrogen is generated. The hydrogen generation device 100 is configured so that the surface of the photocatalytic layer 3 and the surface of the counter electrode 8 face each other across the electrolyte solution layer. Therefore, the distance between the surface of the photocatalytic layer 3 and the surface of the counter electrode 8 is shorter over the entire surfaces thereof than in conventional configurations. Thereby, the protons are sufficiently transferred and diffused to the surface of the counter electrode 8 where the hydrogen evolution reaction occurs. As a result, the protons are supplied efficiently to the vicinity of the surface of the counter electrode 8 even if the hydrogen evolution reaction proceeds, and thus a decrease in the reaction efficiency with the progress of the reaction can be reduced. The generated oxygen and hydrogen are obtained from the first gas outlet 14 and the second gas outlet 15, respectively. Ions are transferred between the first electrolyte solution layer 5 and the second electrolyte solution layer 7 through the separator 6 as the water decomposition reaction proceeds.

$$4h^+ + 2H_2O \rightarrow O_2\uparrow + 4H^+ \tag{1}$$

$$4e^- + 4H^+ \rightarrow 2H_2\uparrow \tag{2}$$

Conventional hydrogen generation devices are configured so that the photocatalytic layer faces the light irradiation side to irradiate the photocatalytic layer with light efficiently. In contrast, the hydrogen generation device 100 of the present embodiment has a configuration in which the photocatalytic layer 3 and the counter electrode 8 face each other across the electrolyte solution layer. In such a configuration, the photocatalytic layer 3 is irradiated with light that has been attenuated after passing through the transparent substrate 1 and the transparent conductive layer 2. Therefore, the hydrogen generation device 100 of the present embodiment seems to be less desirable than conventional hydrogen generation devices only in terms of the light irradiation efficiency. Moreover, in the hydrogen generation device 100, the surface on which the oxygen evolution reaction occurs differs from the light incident surface in the photocatalytic layer 3. Therefore, the holes generated by photoexcitation must be transferred to the opposite surface of the photocatalytic layer 3 therethrough. For these reasons, it is expected that the configuration in which the photocatalytic layer 3 and the counter electrode 8 face each other across the electrolyte solution layer does not seem to be very efficient in the hydrogen evolution. However, contrary to this expectation, the hydrogen generation device 100 sufficiently achieves the transfer and diffusion of protons to the surface of the counter electrode 8, which is the hydrogen evolution section, and thus allows the hydrogen production efficiency to be improved more than the conventional hydrogen generation devices.

In the hydrogen generation device 100, the electrolyte solution layer is separated by the separator 6 into the first electrolyte solution layer 5 in contact with the photocatalytic layer 3 and the second electrolyte solution layer 7 in contact with the counter electrode 8. The separator 6 allows the electrolyte in the electrolyte solution layer to pass therethrough but prevents hydrogen gas and oxygen gas generated in the electrolyte solution layer from passing therethrough. Thereby, oxygen generated on the surface of the photocatalytic layer 3 and hydrogen generated on the surface of the counter electrode 8 can be separated easily.

Furthermore, the hydrogen generation device 100 can be assembled by joining a component in which the transparent conductive layer 2 and the photocatalytic layer 3 are laminated on the transparent substrate 1, a component in which the counter electrode 8 is formed on the back substrate 9, and the separator 6 together by the outer frame 13. Thus, the hydrogen generation device 100 has the advantages that it can be assembled more easily and requires fewer components than conventional hydrogen generation devices.

Second Embodiment

Figure 3:
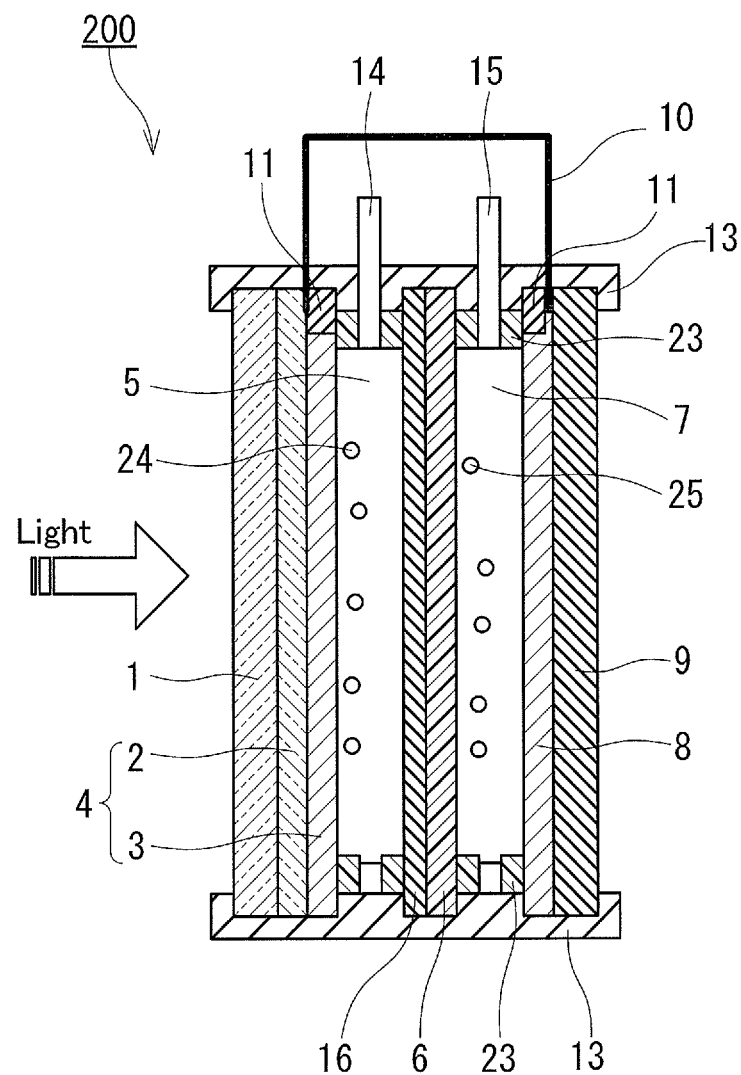
FIG. 3 is a schematic diagram showing the configuration of a hydrogen generation device according to a second embodiment of the present invention.
Figure 4:
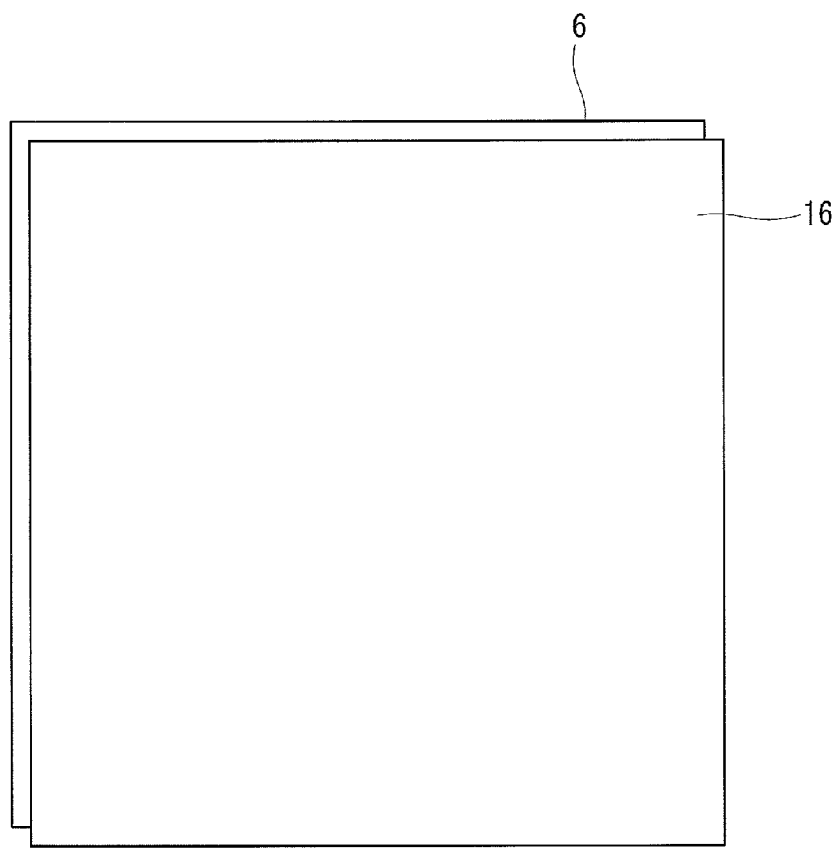
FIG. 4 is a diagram showing a porous member provided as a fixing and supporting member in the hydrogen generation device according to the second embodiment of the present invention, as viewed in the light irradiation direction.

The hydrogen generation device of the second embodiment of the present invention is described with reference to FIG. 3 and FIG. 4. FIG. 3 is a schematic diagram showing the configuration of the hydrogen generation device of the present embodiment. FIG. 4 is a diagram showing a porous member provided as a fixing and supporting member in the hydrogen generation device, as viewed in the light irradiation direction.

A hydrogen generation device 200 of the present embodiment has the same configuration as the hydrogen generation device 100 of the first embodiment except that the fixing and supporting member has a different shape. Therefore, only a porous member 16 provided as the fixing and supporting member is described here.

In the hydrogen generation device 200, the porous member 16 made of an insulating material is disposed on the first electrolyte solution layer 5 side surface of the separator 6. The porous member 16 is joined to the separator 6 and fixed to the outer frame 13. The porous member 16 configured as such can fix the separator 6 in place and support it. In FIG. 4, the positions of the porous member 16 and the separator 6 are displaced from each other to help show the lamination of the porous member 16 and the separator 6. However, in the present embodiment, the porous member 16 and the separator 6 are disposed so that their positions coincide, as viewed in the light irradiation direction.

In the hydrogen generation device 200 shown in FIG. 3, the porous member 16 is provided on the first electrolyte solution layer 5 side of the separator 6, but the position of the porous member 16 is not limited to this. The porous member 16 may be disposed on one side of the separator 6, or may be disposed on both sides thereof. Thereby, the distance between the separator 6 and the photocatalytic layer 3 and the distance between the separator 6 and the counter electrode 8 can be maintained constant over the entire surfaces of the separator 6.

The porous member 16 can be formed of a material having a function of allowing the electrolyte solution to sufficiently pass therethrough, having strength enough to support the separator 6 without being bent, and having insulating properties, like the fixing and supporting member described in the first embodiment. For example, a porous plate, ceramic honeycomb, foamed ceramic, porous plastic, etc. can be used. The porosity of the porous member 16 is preferably, for example, 50 to 90% so that ions can sufficiently be transferred between the first electrolyte solution layer 5 and the second electrolyte solution layer 7 through the separator 6.

Since the operation of the hydrogen generation device 200 is the same as that of the hydrogen generation device 100 described in the first embodiment, the description thereof is omitted here.

The hydrogen generation device 200 can provide the same effects as those of the hydrogen generation device 100 of the first embodiment.

Third Embodiment

Figure 5:
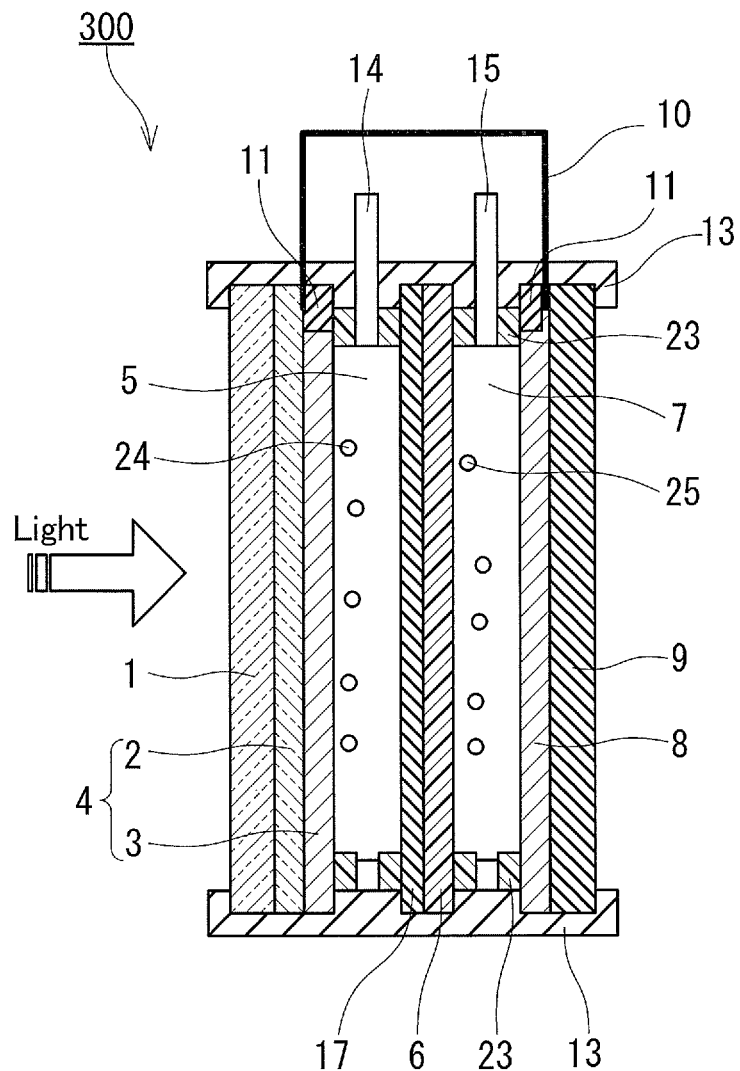
FIG. 5 is a schematic diagram showing the configuration of a hydrogen generation device according to a third embodiment of the present invention.
Figure 6:
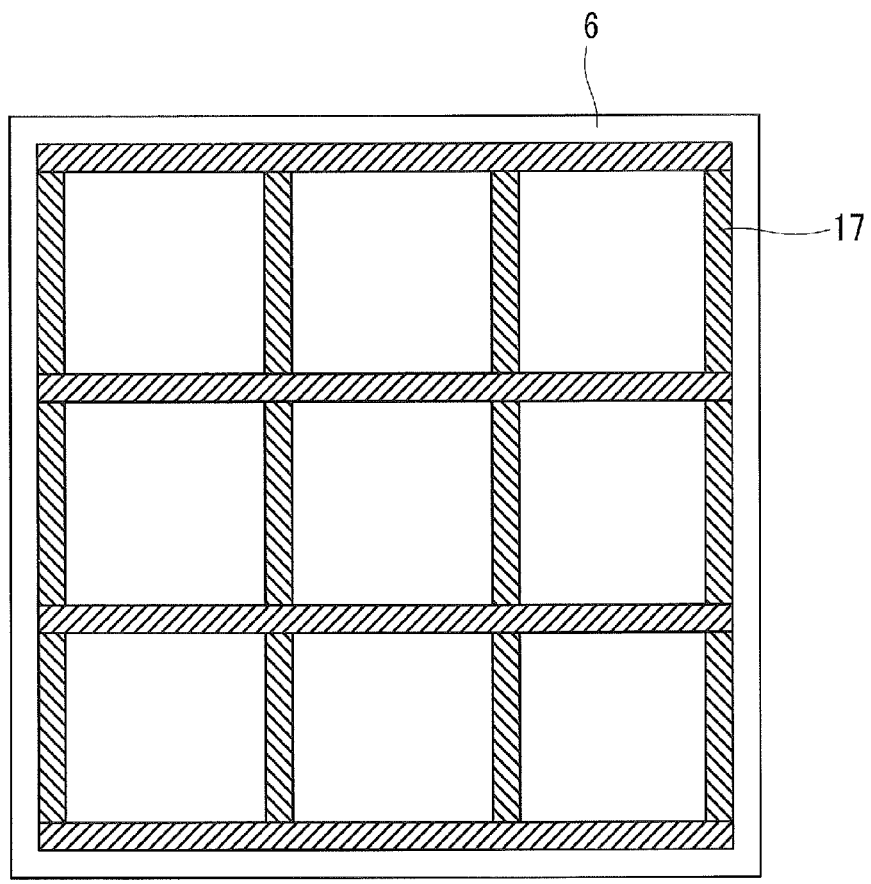
FIG. 6 is a diagram showing a frame member provided as a fixing and supporting member in the hydrogen generation device according to the third embodiment of the present invention, as viewed in the light irradiation direction.

The hydrogen generation device of the third embodiment of the present invention is described with reference to FIG. 5 and FIG. 6. FIG. 5 is a schematic diagram showing the configuration of the hydrogen generation device of the present embodiment. FIG. 6 is a diagram showing a frame member provided as a fixing and supporting member in the hydrogen generation device, as viewed in the light irradiation direction.

A hydrogen generation device 300 of the present embodiment has the same configuration as the hydrogen generation device 100 of the first embodiment except that the fixing and supporting member has a different shape. Therefore, only a frame member 17 provided as the fixing and supporting member is described here.

In the hydrogen generation device 300, the frame member 17 made of an insulating material is disposed on the first electrolyte solution layer 5 side surface of the separator 6. The frame member 17 is joined to the separator 6 and fixed to the outer frame 13. The frame member 17 configured as such can fix the separator 6 in place and support it. As shown in FIG. 6, the frame member 17 has a grid shape in the present embodiment, but the shape is not limited to this. The frame member 17 may have any shape as long as the shape does not inhibit the transfer of ions through the separator 6. For example, if the surface area of the separator 6 covered by the frame member 17 can be 10% or less, preferably 2% or less, of the total surface area of the separator 6, the presence of the frame member 17 has little influence on the transfer of ions.

In the hydrogen generation device 300 shown in FIG. 5, the frame member 17 is provided on the first electrolyte solution layer 5 side of the separator 6, but the position of the frame member 17 is not limited to this. The frame member 17 may be disposed on one side of the separator 6, or may be disposed on both sides thereof. Thereby, the distance between the separator 6 and the photocatalytic layer 3 and the distance between the separator 6 and the counter electrode 8 can be maintained constant over the entire surfaces of the separator 6.

The frame member 17 can be formed of a material having a function of allowing the electrolyte solution to sufficiently pass therethrough, having strength enough to support the separator 6 without being bent, and having insulating properties, like the fixing and supporting member described in the first embodiment. Examples of such a material include plastics, ceramics, and insulation-covered metals.

Since the operation of the hydrogen generation device 300 is the same as that of the hydrogen generation device 100 described in the first embodiment, the description thereof is omitted here.

The hydrogen generation device 300 can provide the same effects as those of the hydrogen generation device 100 of the first embodiment.

Fourth Embodiment

Figure 7:
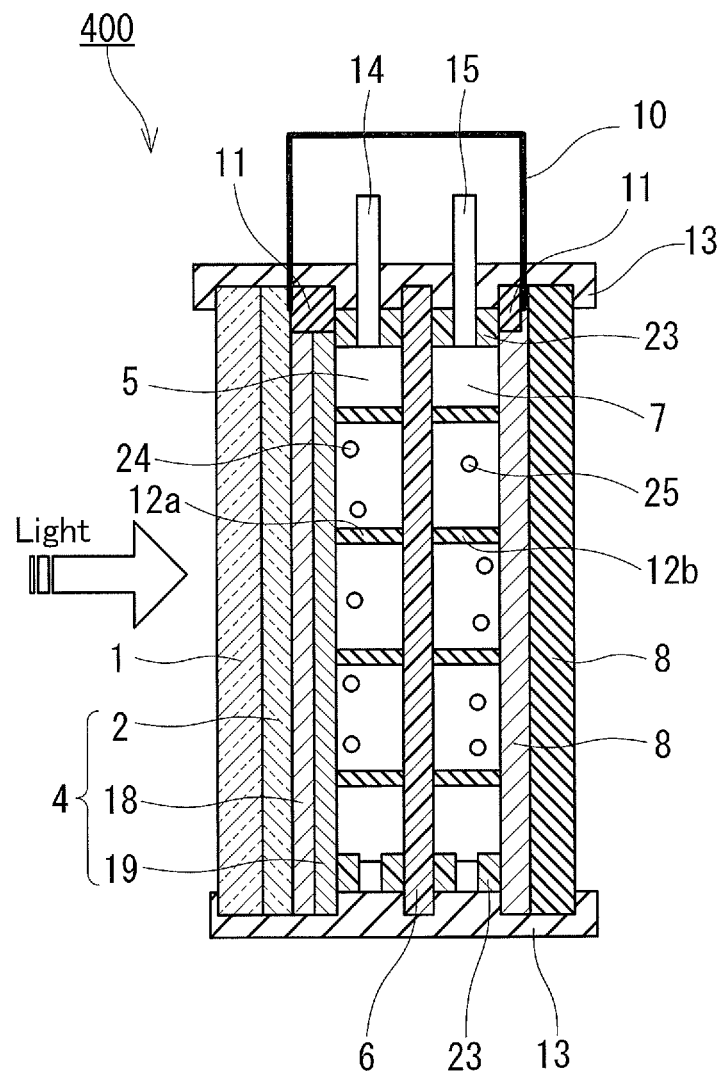
FIG. 7 is a schematic diagram showing the configuration of a hydrogen generation device according to a fourth embodiment of the present invention.
Figure 8:
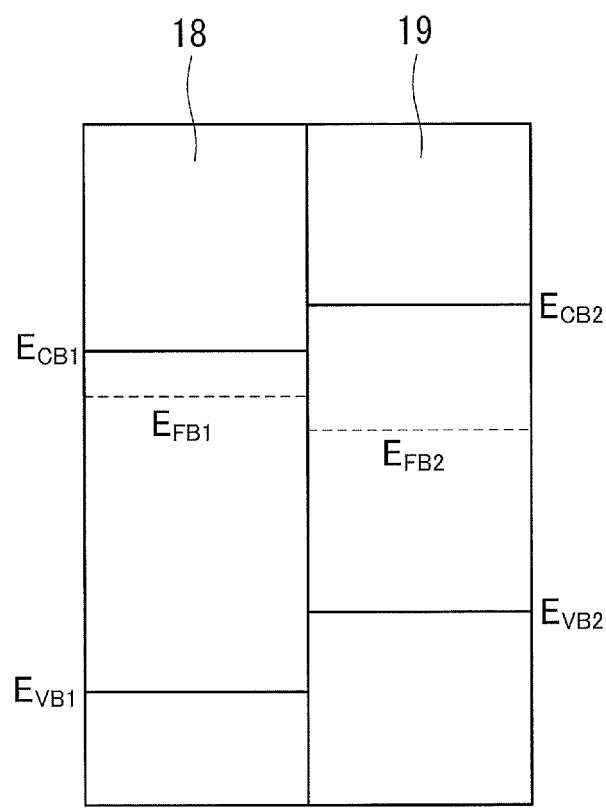
FIG. 8 is a conceptual diagram showing the band structures of a first n-type semiconductor layer and a second n-type semiconductor layer, before being contacted together, which constitute a photocatalytic layer in the hydrogen generation device according to the fourth embodiment of the present invention.

The hydrogen generation device of the fourth embodiment of the present invention is described with reference to FIG. 7 and FIG. 8. FIG. 7 is a schematic diagram showing the configuration of the hydrogen generation device of the present embodiment. FIG. 8 is a conceptual diagram showing the band structures of a first n-type semiconductor layer and a second n-type semiconductor layer, before contacted together, which constitute a photocatalytic layer in the hydrogen generation device of the present embodiment.

A hydrogen generation device 400 of the present embodiment has the same configuration as the hydrogen generation device 100 of the first embodiment except that the photocatalytic layer has a two-layer structure. Therefore, only the structure of the photocatalytic layer is described herein.

The photocatalytic layer of the hydrogen generation device 400 in the present embodiment is composed of a first n-type semiconductor layer 18 and a second n-type semiconductor layer 19 disposed in this order from the light irradiation side. As shown in FIG. 8, the band edge levels ($E_{CB2}$ and $E_{VB2}$) of the conduction band and the valence band in the second n-type semiconductor layer 19, respectively, are higher than the band edge levels ($E_{CB1}$ and $E_{VB1}$) of the conduction band and the valence band in the first n-type semiconductor layer 18, relative to the vacuum level. In addition, the Fermi level ($E_{FB1}$) of the first n-type semiconductor layer 18 is higher than the Fermi level ($E_{FB2}$) of the second n-type semiconductor layer 19, relative to the vacuum level.

When the first n-type semiconductor layer 18 and the second n-type semiconductor layer 19 having such relationships are contacted together, carriers transfer between the first n-type semiconductor layer 18 and the second n-type semiconductor layer 19 so that the Fermi levels match each other at the junction plane therebetween. This results in bending of the band edge. The band edge levels ($E_{CB2}$ and $E_{VB2}$) of the conduction band and the valence band in the second n-type semiconductor layer 19, respectively, are higher than the band edge levels ($E_{CB1}$ and $E_{VB1}$) of the conduction band and the valence band in the first n-type semiconductor layer 18. In addition, the Fermi level ($E_{FB1}$) of the first n-type semiconductor layer 18 is higher than the Fermi level ($E_{FB2}$) of the second n-type semiconductor layer 19. These relationships prevent Schottky barriers from occurring at the junction plane between the first n-type semiconductor layer 18 and the second n-type semiconductor layer 19.

Electrons and holes are generated by photoexcitation in the second n-type semiconductor layer 19. The generated electrons are transferred to the conduction band of the first n-type semiconductor layer 18. The generated holes are transferred to the surface of the second n-type semiconductor layer 19 (the interface between the second n-type semiconductor layer 19 and the first electrolyte solution layer 5) along the bending of the band edge of the valence band. Therefore, the electrons and the holes are charge-separated efficiently without being blocked by the Schottky barriers. This results in a decrease in the probability of the recombination between the electrons and holes generated by photoexcitation in the second n-type semiconductor layer 19. Since the holes are efficiently transferred to the surface of the second n-type semiconductor layer 19, the quantum efficiency of the hydrogen evolution reaction by irradiation with light is further improved.

As the first n-type semiconductor layer 18, for example, titanium oxide, strontium titanate, niobium oxide, zinc oxide, potassium tantalate, etc. can be used suitably. As the second n-type semiconductor layer 19, for example, cadmium sulfide, tantalum oxynitride, tantalum nitride, etc. can be used suitably. As a specific combination of the first n-type semiconductor layer 18 and the second n-type semiconductor layer 19, for example, titanium oxide (anatase type) for the former and cadmium sulfide for the latter are used suitably.

Since the operation of the hydrogen generation device 400 is the same as that of the hydrogen generation device 100 described in the first embodiment, the description thereof is omitted here.

The hydrogen generation device 400 can provide the same effects as those of the hydrogen generation device 100 of the first embodiment. As described above, in the hydrogen generation device 400, the photocatalytic layer is composed of two n-type semiconductor layers. With this structure, the charge separation of electrons and holes in the photocatalytic layer is promoted in the hydrogen generation device 400 more than in the hydrogen generation device 100 of the first embodiment. Accordingly, the effect of accelerating the oxygen evolution reaction on the surface of the photocatalytic layer and the hydrogen evolution reaction on the surface of the counter electrode 8 can be obtained.

The present embodiment describes an embodiment in which the photocatalytic layer 3 of the hydrogen generation device 100 of the first embodiment is composed of two n-type semiconductor layers. However, the structure in the present embodiment can be applied to the photocatalytic layer 3 in the hydrogen generation device 200 of the second embodiment or in the hydrogen generation device 300 of the third embodiment as well.

Fifth Embodiment

Figure 9:
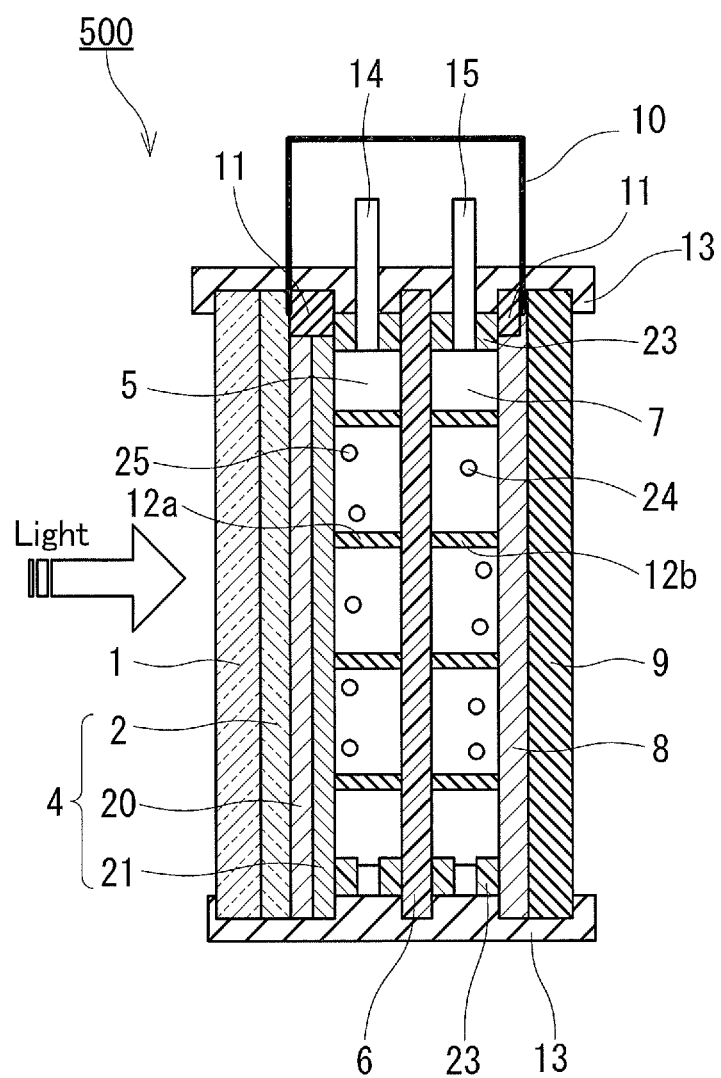
FIG. 9 is a schematic diagram showing the configuration of a hydrogen generation device according to a fifth embodiment of the present invention.
Figure 10:
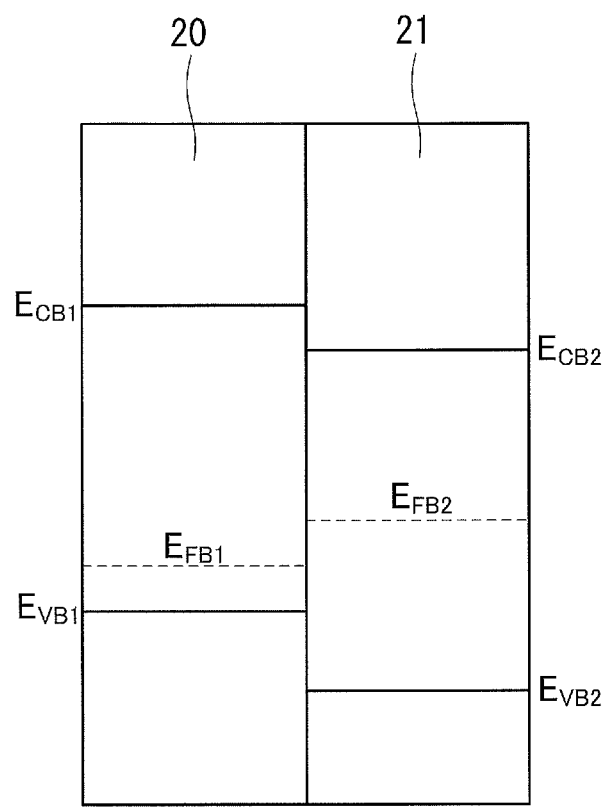
FIG. 10 is a conceptual diagram showing the band structures of a first p-type semiconductor layer and a second p-type semiconductor layer, before being contacted together, which constitute a photocatalytic layer in the hydrogen generation device according to the fifth embodiment of the present invention.

The hydrogen generation device of the fifth embodiment of the present invention is described with reference to FIG. 9 and FIG. 10. FIG. 9 is a schematic diagram showing the configuration of the hydrogen generation device of the present embodiment. FIG. 10 is a conceptual diagram showing the band structures of a first p-type semiconductor layer and a second p-type semiconductor layer, before being contacted together, which constitute a photocatalytic layer in the hydrogen generation device of the present embodiment.

A hydrogen generation device 500 of the present embodiment has the same configuration as the hydrogen generation device 100 of the first embodiment except that the photocatalytic layer has a two-layer structure. Therefore, only the structure of the photocatalytic layer is described herein.

The photocatalytic layer of the hydrogen generation device 500 in the present embodiment is composed of a first p-type semiconductor layer 20 and a second p-type semiconductor layer 21 disposed in this order from the light irradiation side. Since the photocatalytic layer is formed of p-type semiconductors in the present embodiment, hydrogen evolution reaction occurs on the photocatalytic layer and oxygen evolution reaction occurs on the counter electrode 8, unlike the first to fourth embodiments. Therefore, the first gas outlet 14 connected to the first electrolyte solution layer 5 serves as a hydrogen gas outlet, and the second gas outlet 15 connected to the second electrolyte solution layer 7 serves as an oxygen gas outlet.

As shown in FIG. 10, the band edge levels ($E_{CB2}$ and $E_{VB2}$) of the conduction band and the valence band in the second p-type semiconductor layer 21, respectively, are lower than the band edge levels ($E_{CB1}$ and $E_{VB1}$) of the conduction band and the valence band in the first p-type semiconductor layer 20, relative to the vacuum level. In addition, the Fermi level ($E_{FB1}$) of the first p-type semiconductor layer 20 is lower than the Fermi level ($E_{FB2}$) of the second p-type semiconductor layer 21, relative to the vacuum level.

When the first p-type semiconductor layer 20 and the second p-type semiconductor layer 21 having such relationships are contacted together, carriers transfer between the first p-type semiconductor layer 20 and the second p-type semiconductor layer 21 so that the Fermi levels match each other at the junction plane therebetween. This results in bending of the band edge. The band edge levels ($E_{CB2}$ and $E_{VB2}$) of the conduction band and the valence band in the second p-type semiconductor layer 21, respectively, are lower than the band edge levels ($E_{Cb1}$ and $E_{VB1}$) of the conduction band and the valence band in the first p-type semiconductor layer 20. In addition, the Fermi level ($E_{FB1}$) of the first p-type semiconductor layer 20 is lower than the Fermi level ($E_{FB2}$) of the second p-type semiconductor layer 21. These relationships prevent Schottky barriers from occurring at the junction plane between the first p-type semiconductor layer 20 and the second p-type semiconductor layer 21.

Electrons and holes are generated by photoexcitation in the second p-type semiconductor layer 21. The generated holes are transferred to the valence band of the first n-type semiconductor layer 20. The generated electrons are transferred to the surface of the second p-type semiconductor layer 21 (the interface between the second p-type semiconductor layer 21 and the first electrolyte solution layer 5) along the bending of the band edge of the conduction band. Therefore, the electrons and the holes are charge-separated efficiently without being blocked by the Schottky barriers. This results in a decrease in the probability of the recombination between the electrons and holes generated by photoexcitation in the second p-type semiconductor layer 21. Since the electrons are efficiently transferred to the surface of the second p-type semiconductor layer 21, the quantum efficiency of the hydrogen evolution reaction by irradiation with light is further improved.

As the first p-type semiconductor layer 20, for example, copper (I) oxide, etc. can be used suitably. As the second p-type semiconductor layer 21, for example, copper indium sulfide, copper indium gallium selenide, etc. can be used suitably. As a specific combination of the first p-type semiconductor layer 20 and the second p-type semiconductor layer 21, for example, copper (I) oxide for the former and copper indium sulfide for the latter can be used suitably.

Since the operation of the hydrogen generation device 500 is the same as that of the hydrogen generation device 100 described in the first embodiment, the description thereof is omitted here.

The hydrogen generation device 500 can provide the same effects as those of the hydrogen generation device 100 of the first embodiment. As described above, in the hydrogen generation device 500, the photocatalytic layer is composed of two p-type semiconductor layers. With this structure, the charge separation of electrons and holes in the photocatalytic layer is promoted in the hydrogen generation device 500 more than in the hydrogen generation device 100 of the first embodiment. Accordingly, the hydrogen evolution reaction on the surface of the photocatalytic layer and the oxygen evolution reaction on the surface of the counter electrode 8 are further accelerated.

The present embodiment describes an embodiment in which the photocatalytic layer 3 of the hydrogen generation device 100 of the first embodiment is composed of two p-type semiconductor layers. However, the structure in the present embodiment can be applied to the photocatalytic layer 3 in the hydrogen generation device 200 of the second embodiment or in the hydrogen generation device 300 of the third embodiment as well.

Sixth Embodiment

Figure 11:
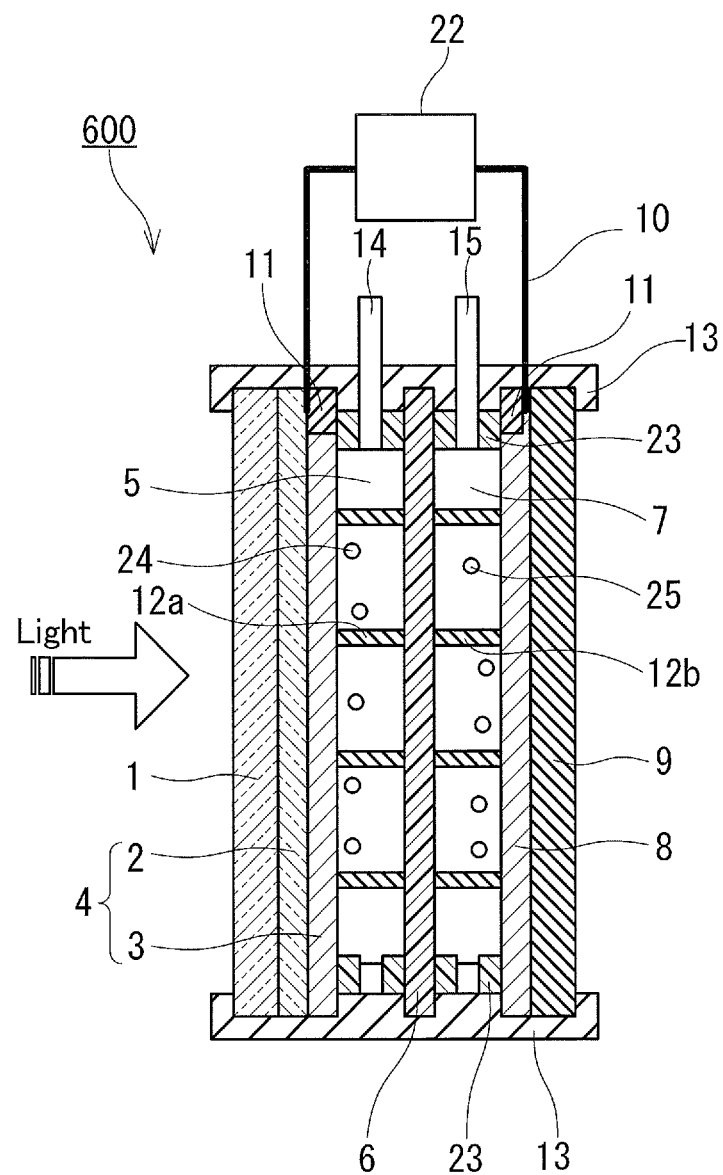
FIG. 11 is a schematic diagram showing the configuration of a hydrogen generation device according to a sixth embodiment of the present invention.

The hydrogen generation device of the sixth embodiment of the present invention is described with reference to FIG. 11. FIG. 11 is a schematic diagram showing the configuration of the hydrogen generation device of the present embodiment.

In a hydrogen generation device 600 of the present embodiment, an electric power source 22 for applying a bias voltage is provided in the conducting wire 10, which is an electrical connection path between the transparent conductive layer 2 and the counter electrode 8. The hydrogen generation device 600 has the same configuration as the hydrogen generation device 100 of the first embodiment except for this point. A bias voltage is applied to the hydrogen generation device 600 simultaneously with irradiation with light. Thereby, the oxygen evolution reaction on the surface of the photocatalytic layer 3 and the hydrogen evolution reaction on the surface of the counter electrode 8 are further accelerated.

The present embodiment employs a configuration in which a bias voltage is applied to the hydrogen generation device 100 of the first embodiment. However, the configuration of the present embodiment can be applied to all the hydrogen generation devices described in the second to fifth embodiments as well.

EXAMPLES

Example

Figure 12:
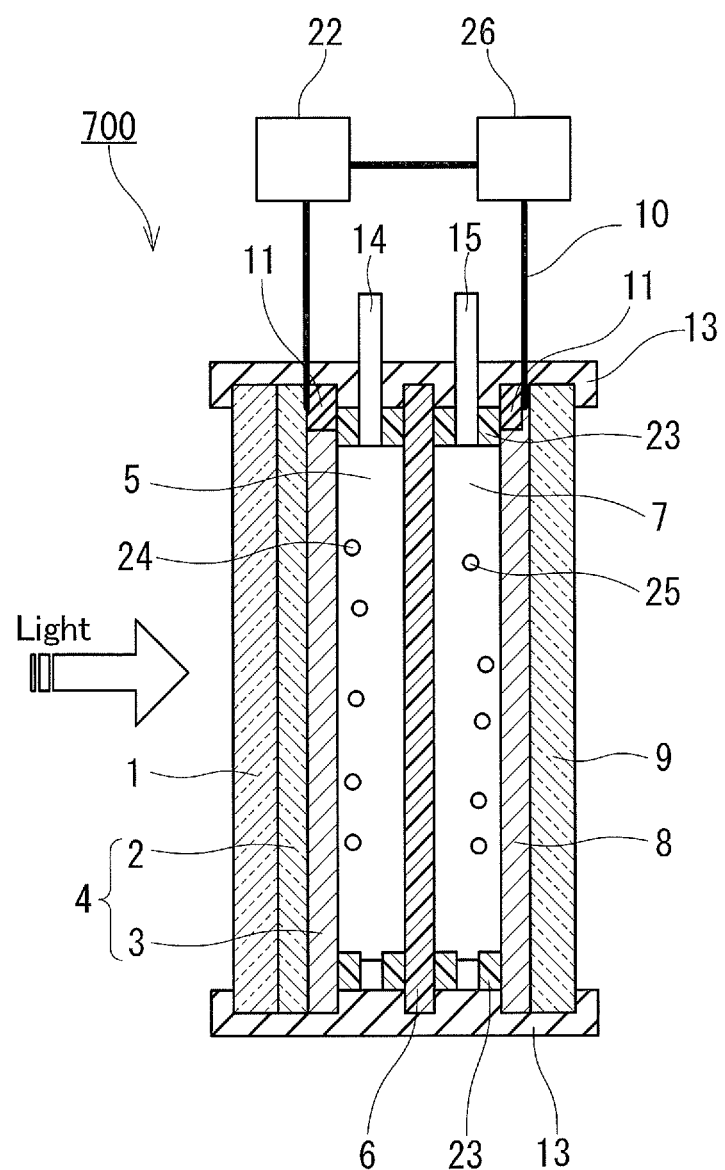
FIG. 12 is a schematic diagram showing the configuration of a hydrogen generation device used in an example.

An example of the present invention is described specifically. As an example, a hydrogen generation device 700 shown in FIG. 12 was used. This hydrogen generation device 700 had the same configuration as the hydrogen generation device 600 described in the sixth embodiment except that the fixing and supporting member (the first projections 12*a* and the second projections 12*b*) is not provided. An ammeter 26 for measuring an obtained photocurrent was connected to the conducting wire 10.

As the transparent substrate 1, a glass substrate (50 mm long, 30 mm wide, and 2.5 mm thick) was used. As the transparent conductive layer 2, an ITO film was formed on this glass substrate by sputtering. As the photocatalytic layer 3, a 0.5-μm-thick titanium oxide film (anatase type) was formed on the ITO film by sputtering.

As the back substrate 9, a glass substrate (50 mm long, 30 mm wide, and 2.5 mm thick) was used. As the counter electrode 8, a platinum film was formed on this glass substrate by sputtering.

A component in which the transparent conductive layer 2 and the photocatalytic layer 3 were provided on the transparent substrate 1 and a component in which the counter electrode 8 is provided on the back substrate 9 were opposed so that the photocatalytic layer 3 and the counter electrode 8 faced each other across the separator 6. These components were held together by the outer frame 13. The distance between the surface of the photocatalytic layer 3 and the counter electrode 8 was 15 mm. The separator 6 was disposed with an almost equal distance from the surface of the photocatalytic layer 3 and the surface of the counter electrode 8 and almost in parallel with these surfaces. As the separator 6, an ion exchange membrane ("Nafion" (registered trademark) (DuPont)) that allows protons in the electrolyte solution layer to pass therethrough and prevents oxygen and hydrogen generated in the electrolyte solution layer from passing therethrough was used. The separator 6 had almost the same shape and size as the transparent substrate 1 and the back substrate 9.

The transparent conductive layer 2 and the counter electrode 8 were connected electrically by the conducting wire 10, and the electric power source 22 for applying a bias voltage was provided in the connection path therebetween. Furthermore, the first gas outlet 14 and the second gas outlet 15 were provided so that they penetrate the outer frame 13. 0.1 mol $L^{-1}$ of sodium hydroxide aqueous solution was used as the electrolyte solution.

The hydrogen generation device 700 of the present example fabricated as mentioned above was irradiated with light with a xenon lamp at an intensity of 100 W from the transparent substrate 1 side. At this time, upon the irradiation, a bias voltage of +0.5 V was applied between the transparent conductive layer 2 and the counter electrode 8 by the electric power source 22. The photocurrent flowing between the transparent conductive layer 2 and the counter electrode 8 was measured, and it was +1.57 mA.

Comparative Example

Figure 13:
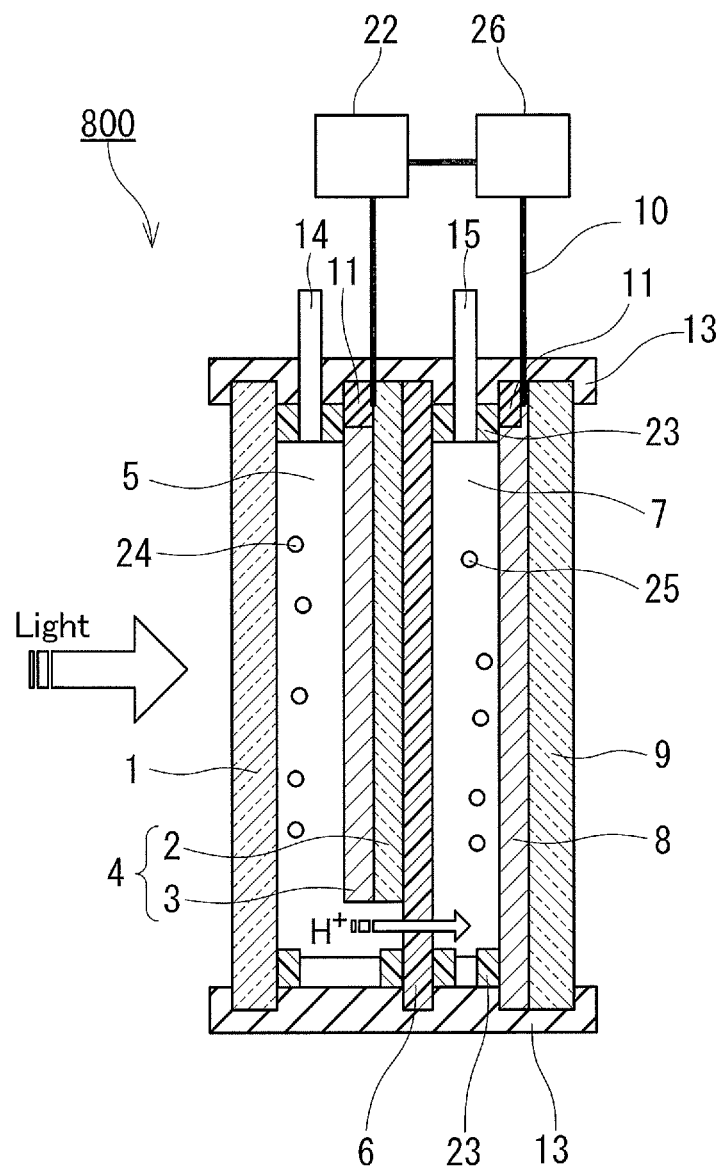
FIG. 13 is a schematic diagram showing the configuration of a hydrogen generation device used in a comparative example.

As a comparative example, a hydrogen generation device 800 shown in FIG. 13 was fabricated. In this hydrogen generation device 800, the photocatalytic electrode 4 composed of the transparent conductive layer 2 and the photocatalytic layer 3 was placed on the surface of the separator 6 so that the transparent conductive layer 2 faced the counter electrode 8. Furthermore, a gap (10 mm long and 30 mm wide) was provided below the photocatalytic electrode 4 to allow protons in the electrolyte solution to pass therethrough.

The hydrogen generation device 800 of the comparative example was fabricated in the same manner as the hydrogen generation device 700 of the example except for the position and shape of the photocatalytic electrode 4. This hydrogen generation device 800 was irradiated with light under the same conditions as in the example. As a result, the photocurrent flowing between the transparent conductive layer 2 and the counter electrode 8 was +0.57 mA.

As described above, in the hydrogen generation device of the present invention in which the photocatalytic layer was disposed to face the counter electrode across the electrolyte solution layer, a higher photocurrent flowed than in the conventional hydrogen generation device in which the photocatalytic layer was disposed to face the light irradiation side. This means that the hydrogen generation device of the present invention improved the efficiency of hydrogen evolution reaction.

INDUSTRIAL APPLICABILITY

Since the hydrogen generation device of the present invention can improve the quantum efficiency of hydrogen generation reaction by light irradiation, it can be suitably used as a hydrogen source for fuel cells, or the like.

The invention claimed is:

1. A hydrogen generation device comprising:
   a transparent substrate;
     a photocatalytic electrode formed of a transparent conductive layer disposed on the transparent substrate and a photocatalytic layer disposed on the transparent conductive layer;
     a counter electrode connected electrically to the transparent conductive layer;
     a water-containing electrolyte solution layer provided between the photocatalytic electrode and the counter electrode;
     a separator that separates the electrolyte solution layer into a first electrolyte solution layer in contact with the photocatalytic electrode and a second electrolyte solution layer in contact with the counter electrode;
     a first gas outlet, connected to the first electrolyte solution layer, for discharging oxygen gas or hydrogen gas generated in the first electrolyte solution layer; and
     a second gas outlet, connected to the second electrolyte solution layer, for discharging hydrogen gas or oxygen gas generated in the second electrolyte solution layer,
   wherein the photocatalytic electrode and the counter electrode are arranged so that a surface of the photocatalytic layer and a surface of the counter electrode face each other,
   the separator allows an electrolyte in the electrolyte solution layer to pass therethrough and prevents hydrogen gas and oxygen gas in the electrolyte solution layer from passing therethrough,
   a light irradiation efficiency when the photocatalytic layer is irradiated with light from a side of the transparent substrate is lower than a light irradiation efficiency when the photocatalytic layer is irradiated with light from a side of the photocatalytic layer,
   the photocatalytic layer is formed of
     a first n-type semiconductor layer and a second n-type semiconductor layer disposed in this order from a side of the transparent conductive layer, or
     a first p-type semiconductor layer and a second p-type semiconductor layer disposed in this order from a side of the transparent conductive layer,
   when the photocatalytic layer is formed of the first n-type semiconductor layer and the second n-type semiconductor layer, relative to a vacuum level,
     (I) band edge levels of a conduction band and a valence band in the second n-type semiconductor layer, respectively, are higher than band edge levels of a conduction band and a valence band in the first n-type semiconductor layer, and
     (II) a Fermi level of the first n-type semiconductor layer is higher than a Fermi level of the second n-type semiconductor layer, and
   when the photocatalytic layer is formed of the first p-type semiconductor layer and the second p-type semiconductor layer, relative to a vacuum level,
     (I) band edge levels of a conduction band and a valence band in the second p-type semiconductor layer, respectively, are lower than band edge levels of a conduction band and a valence band in the first p-type semiconductor layer, and
     (II) a Fermi level of the first p-type semiconductor layer is lower than a Fermi level of the second p-type semiconductor layer.

2. The hydrogen generation device according to claim 1, further comprising an outer frame that holds the transparent substrate, the photocatalytic electrode, the electrolyte solution layer, the separator, and the counter electrode together.

3. The hydrogen generation device according to claim 1, further comprising a fixing and supporting member that fixes the separator in place and supports the separator, wherein
   the fixing and supporting member fixes and supports the separator so that the separator is disposed with predetermined distances from the surface of the photocatalytic layer and the surface of the counter electrode, respectively, and in parallel with the surfaces.

4. The hydrogen generation device according to claim 3, wherein
   the fixing and supporting member includes a first projection provided on the surface of the photocatalytic layer and a second projection provided on the surface of the counter electrode, and
   the first projection and the second projection are provided at positions corresponding to each other with the separator interposed therebetween.

5. The hydrogen generation device according to claim 3, further comprising an outer frame that holds the transparent substrate, the photocatalytic electrode, the electrolyte solution layer, the separator, and the counter electrode together, wherein
   the fixing and supporting member is a porous member that is provided at at least one position selected from a position between the photocatalytic layer and the separator and a position between the counter electrode and the separator, and that is held by the outer frame.

6. The hydrogen generation device according to claim 3, further comprising an outer frame that holds the transparent substrate, the photocatalytic electrode, the electrolyte solution layer, the separator, and the counter electrode together, wherein
   the fixing and supporting member is a frame member that is provided at at least one position selected from a position between the photocatalytic layer and the separator and a position between the counter electrode and the separator, and that is held by the outer frame.

7. The hydrogen generation device according to claim 1, wherein the counter electrode has a shape of a flat plate, a flat plate having a through-hole, or a flat plate having a slit.

8. The hydrogen generation device according to claim 1, further comprising an electric power source, provided in an electrical connection path between the transparent conductive layer and the counter electrode, for applying a bias voltage.

9. The hydrogen generation device according to claim 1, wherein
   the transparent substrate, the photocatalytic electrode, the first electrolyte solution layer, the separator, the second electrolyte solution layer, and the counter electrode are disposed in this order from a light receiving surface side, and
   the first electrolyte solution layer is in contact with the photocatalytic electrode and the second electrolyte solution layer is in contact with the counter electrode.

10. The hydrogen generation device according to claim 1, wherein the surface of the counter electrode reflects light.

11. The hydrogen generation device according to claim 1, wherein the photocatalytic layer made of a semiconductor material acting as a photocatalyst is provided so that the surface of the photocatalytic layer is exposed and in contact with the first electrolyte solution layer.

12. The hydrogen generation device according to claim 3, wherein the surface of the photocatalyric layer, made of a semiconductor material acting as a photocatalyst, on a side of the first electrolyte solution layer is in contact only with the first electrolyte solution layer, the fixing and supporting member, and a sealing material of the first electrolyte solution layer.

\* \* \* \* \*